Jay & Danner,
Egg-Beater,
N° 27,908. Patented Apr. 17, 1860.

Attest:
John Quincy Adams
J. A. Middicomb

Inventors:
James M. Jay
John Danner
by their Attorney
Thos. H. Dodge

UNITED STATES PATENT OFFICE.

JAMES M. JAY AND JOHN DANNER, OF CANTON, OHIO.

EGG-BEATER.

Specification of Letters Patent No. 27,908, dated April 17, 1860.

*To all whom it may concern:*

Be it known that we, JAMES M. JAY and JOHN DANNER, both of Canton, in the county of Stark, in the State of Ohio, have invented a new and useful Combined Egg-Beater, Ice-Cream Freezer, and Churn; and we hereby declare that the following is a full, clear, and exact description thereof, reference being had to the accompanying drawings, and to the letters of reference marked thereon, forming a part of this specification, in which—

Figure 1:
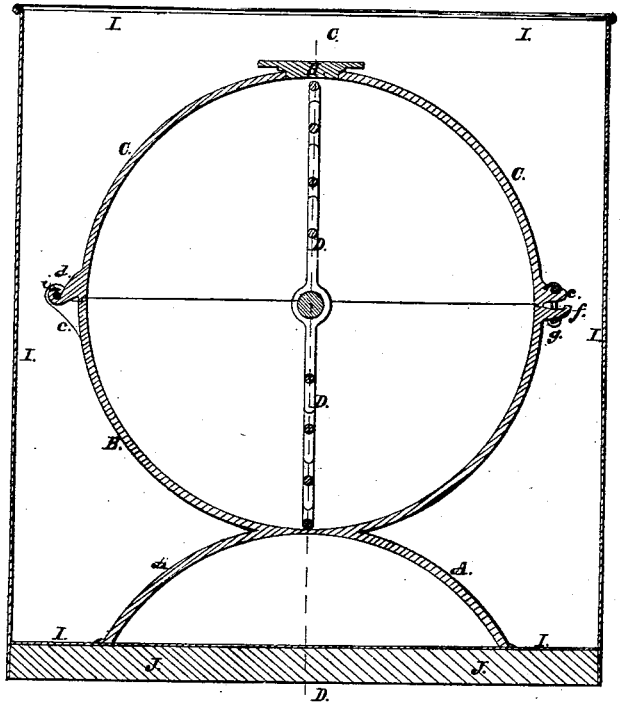
Figure 2:
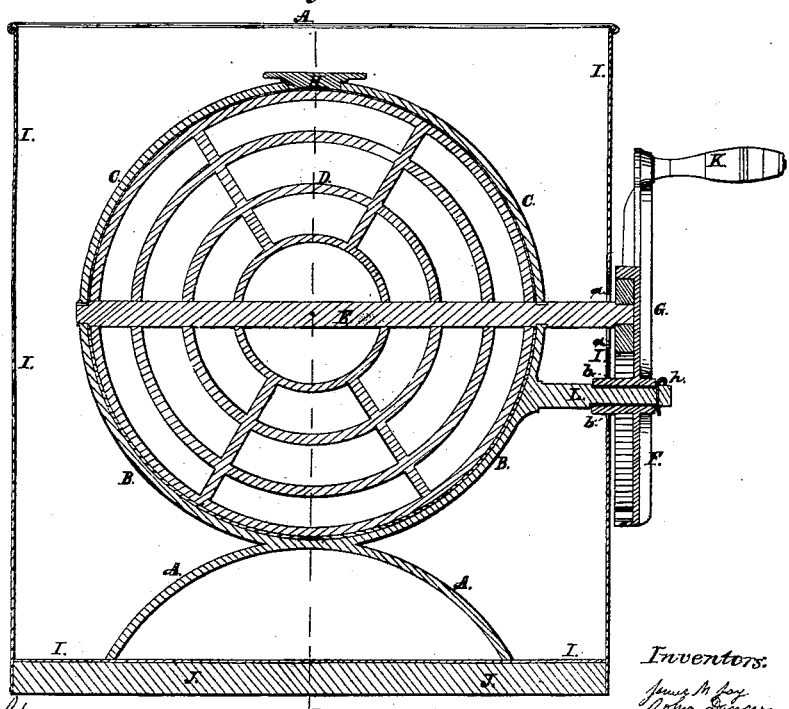

Figure 1 represents a vertical section through the center of the device on line A B, Fig. 2, while Fig. 2 represents a similar section on line C D, Fig. 1.

This invention consists in combining with the egg beater recently patented to James M. Jay and John Danner, assignees of James M. Jay (Feb. 7, 1860) the principal parts of which are represented by the letters A, B, C, D, E, F, and G, of a ventilating cap piece H, and an outer casing I. The casing I is not intended to have a cover, although one might be used if preferred, while the bottom is provided with a non-conducting base piece J. The case I, is also provided on one side with two holes $a$ and $b$.

The operation is as follows, viz: When the device is to be used as an egg beater, pin $h$, can be taken out of the end of standard L, which projects from the side of the hollow part B, and the gear wheel F, slipped off, when the parts, A, B, C, are shoved laterally so as to cause gear wheel G, and standard L, to pass through the holes $a$, $b$, in the side of the case I. The operative part of the device can then be removed from the case and the main gear wheel F, replaced. Clasp $g$ is then swung up from under the projecting lip $f$ and the top part C, raised, and if necessary entirely removed by unhooking the projecting lip $d$, on the opposite side of piece C, from under pin $i$, which is passed through ears $c$, one of which is shown in Fig. 1. After the eggs are placed in the hollow bottom part B, the top part C, is replaced and clasp $g$, which is supported on projecting lip $e$, is then swung down as shown in Fig. 1. The operator now takes hold of handle K, connected with gear wheel F, and by turning the same gives a rapid rotary motion to small gear wheel G, attached to shaft E whereby the dashers or stirrers D, on shaft E, are caused to move with great velocity, thus beating the eggs in a most perfect manner, as is fully described in the patent before referred to. Instead of taking the operative part of the device out of the case I, it might be used while in the case to beat eggs.

In using the device for a churn, the ventilating cap piece H, is to be removed so as to permit of the free ingress and egress of air—the dashers D, being operated in the same manner before described. The ventilating cap piece H, can be made to screw in, if preferred.

When the device is to be used for an ice cream freezer then the cap H, must be on; and after the cream has been placed in part B, and covered by part C, the space between the inner sides of case I, and the parts A, B, and C, are to be filled with the freezing mixture and then a rapid motion is given to the dashers D, as before set forth. Owing to the form of the interior of the parts B C, the material is thrown toward the center by means of the outer beater being of a form which enables it to sweep the inner surface of the parts B and C.

As the motion is more rapid at the center than at the sides where the shaft passes through the case, the material has no tendency to pass out or run upon the journals of the shaft E, when in motion.

In using the device for a freezer, it is found that cream can be frozen in a very short time, owing to its being kept constantly in contact with the inner surfaces of parts B, and C. The cream can be easily examined by simply removing the ventilating cap H, since the outer dasher will bring some of the cream close up to the opening and that too, from the very bottom of the part B.

The case I is made of metal, but can be made of wood or any suitable material.

Having described our combined egg beater, ice cream freezer, and churn what we claim as our invention and desire to secure by Letters Patent, is:

5 The combination of the beating device represented by letters B, C, and D, in combination with the case I, substantially as and for the purposes set forth.

In witness whereof we have hereunto signed our names.

JAMES M. JAY.
JOHN DANNER.

In presence of—
DANIEL GOTSHALL,
LEWIS OHLIGER.